US007100108B2

(12) United States Patent
Chakmakian

(10) Patent No.: US 7,100,108 B2
(45) Date of Patent: Aug. 29, 2006

(54) SOFTWARE PROGRAM UTILITY THAT ISOLATES TRANSLATABLE ENGLISH TEXT FROM MACHINE CODE AND MERGES THE TEXT INTO ONE FILE FOR REVIEW PURPOSES

(75) Inventor: David Matthew Chakmakian, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 09/943,945

(22) Filed: Aug. 31, 2001

(65) Prior Publication Data

US 2004/0205649 A1  Oct. 14, 2004

(51) Int. Cl.
*G06N 3/00* (2006.01)
(52) U.S. Cl. ..................................... 715/513
(58) Field of Classification Search .............. 704/5, 704/2, 3, 6, 4; 715/507, 530, 707, 513, 517, 715/523
See application file for complete search history.

(56) References Cited

U.S. PATENT DOCUMENTS

| | | | | |
|---|---|---|---|---|
| 4,420,817 | A * | 12/1983 | Yoshida ........................ | 704/6 |
| 4,604,698 | A | 8/1986 | Ikemoto et al. | |
| 4,706,212 | A * | 11/1987 | Toma ............................ | 704/2 |
| 4,962,452 | A * | 10/1990 | Nogami et al. ................ | 704/5 |
| 5,091,876 | A | 2/1992 | Kumano et al. | |
| 5,132,901 | A | 7/1992 | Yokogawa | |
| 5,140,522 | A | 8/1992 | Ito et al. | |
| 5,848,386 | A | 12/1998 | Motoyama | |
| 6,208,956 | B1 | 3/2001 | Motoyama | |
| 6,434,518 | B1 * | 8/2002 | Glenn ........................... | 704/3 |
| 6,438,566 | B1 * | 8/2002 | Okuno et al. ................. | 715/512 |
| 6,651,217 | B1 * | 11/2003 | Kennedy et al. ............. | 715/507 |
| 6,865,713 | B1 * | 3/2005 | Bates et al. .................. | 715/512 |

FOREIGN PATENT DOCUMENTS

| | | |
|---|---|---|
| JP | 63037471 | 2/1988 |
| JP | 7306861 | 11/1995 |
| JP | 8297675 A | 11/1996 |

OTHER PUBLICATIONS

IBM Technical Disclosure Bulletin, "Regular Language Transcription Machine", vol. 25, No. 1, (Jun. 1982), pp. 185-189, IBM Corporation.
IBM Technical Disclosure Bulletin, "Translation-Example Retrieving Method", vol. 31, No. 3, (Aug. 1988), pp. 59-61, IBM Corporation.
IBM Technical Disclosure Bulletin, "X/Open Message Translation Tool (Xaltu) for AIX", vol. 38, No. 03, (Mar. 1995), pp. 405-410, IBM Corporation.

* cited by examiner

*Primary Examiner*—Stephen Hong
*Assistant Examiner*—Kyle Stork
(74) *Attorney, Agent, or Firm*—J. Bruce Schelkopf; Dillon & Yudell LLP

(57) ABSTRACT

The foregoing objects are achieved as is now described. A data processing system reviews an instruction data structure to isolate comment text items. After these comment text items are translated, translations are copied from a translated text data structure and they are combined into a single combined text data structure with the translations of the comment text items. Inside the combined text data structure, comment text items are then arranged, each with its translation, in a manner that allows for easy review. The combined text data structure is then displayed to the user, who is given the opportunity to modify the translations. Modifications are then propagated to the combined text data structure and the translated text data structure, which contains the translations.

20 Claims, 3 Drawing Sheets

SOFTWARE PROGRAM UTILITY THAT ISOLATES TRANSLATABLE ENGLISH TEXT FROM MACHINE CODE AND MERGES THE TEXT INTO ONE FILE FOR REVIEW PURPOSES

BACKGROUND OF THE INVENTION

1. Technical Field

The present invention relates in general to reviewing translations and in particular to reviewing translations of comments associated with data processing system instructions. Still more particularly, the present invention relates to isolating comment portions of a data processing system instruction data structure and preparing them into a single data structure with translations of the same comments.

2. Description of the Related Art

Data processing system instruction sets have become one of the most portable commodities of the twenty-first century. As data processing systems have proliferated throughout the world, companies and individuals who produce instruction sets for data processing systems have attempted to export their products to service a transnational market. Moreover, as the ability of persons in different countries to collaborate on the development of data processing system instruction sets has grown, the ability to bridge language barriers in the production of data processing system instruction sets has taken on increasing importance. Fortunately, the application programming and machine languages in which data processing system instruction sets are written are not tied to any national language as deeply as they are tied to the universal languages of mathematics and Boolean logic. It is not an infrequent occurrence for a programmer, whose native language is English, to be able to comprehend lines of code written by a programmer whose native language is French.

In spite of the universality of computer programming languages, the same can not be said of the comment lines inserted into the code to aid in understanding. As programs grow in complexity, remark statements, also called REM statements, and other items of comment text are frequently inserted into the code to aid in understand its function. When the code is sent to a colleague or user who speaks and reads a language other than that spoken and read by the original author, the comment text items must be translated to the receivers language, or they lose all value. Translations of these comment text items must then be reviewed for accuracy. The current method of reviewing translations requires that the reviewer deal with two separate files, one containing the comment text items in their original language, and one containing translations of the comment text items in the language of the intended recipient. The reviewer must separately print them, separately display them on separate screens, or otherwise switch from viewing one version of a comment in one file to viewing its translation in a separate file. What is needed is a manner of reviewing translations wherein a comment text item is displayed and stored with its translation, rather than being displayed and stored with other comments that are in the same language.

SUMMARY OF THE INVENTION

It is therefore one object of the present invention to improve the reviewing of translations.

It is another object of the present invention to improve reviewing of translations of comments associated with data processing system instructions.

It is yet another object of the present invention to isolate comment portions of a data processing system instruction data structure and preparing them into a single data structure with translations of the same comments.

The foregoing objects are achieved as is now described. A data processing system reviews an instruction data structure to isolate comment text items. After these comment text items are translated, translations are copied from a translated text data structure and they are combined into a single combined text data structure with the translations of the comment text items. Inside the combined text data structure, comment text items are then arranged, each with its translation, in a manner that allows for easy review. The combined text data structure is then displayed to the user, who is given the opportunity to modify the translations. Modifications are then propagated to the combined text data structure and the translated text data structure, which contains the translations.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
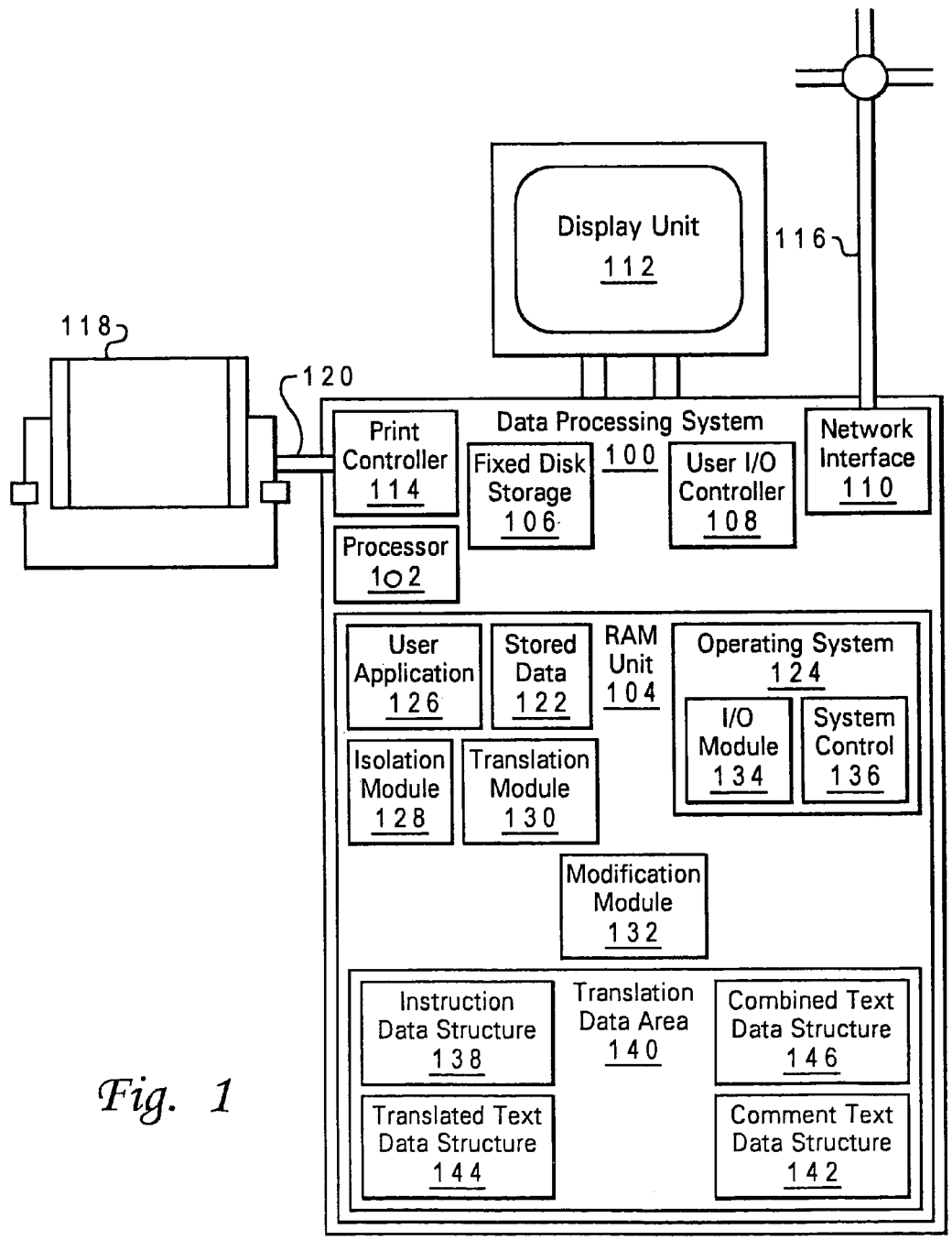
FIG. 1 depicts a data processing system equipped with a series of hardware units, software modules, data structures, and peripherals, in which a preferred embodiment of the present invention may be implemented.

With reference now to the figures, and in particular with reference to FIG. 1, a data processing system equipped with a series of hardware units, software modules, data structures, and peripherals, in which a preferred embodiment of the present invention may be implemented, is illustrated. Data processing system 100 is represented in a highly simplified manner, and many possible components, which are not critical to understanding the present invention and are familiar to those skilled in the art, are omitted for the sake of clarity. Data processing system 100 will typically contain a processor 102, a RAM unit 104, a fixed disk storage unit 106, a user I/O controller 108, a network interface 110, a display unit 112, and a print controller 114. Data processing system 100 will typically attach to a network 116, and will typically attach to an output device 118, such as a printer, across a direct inter-system interface 120, such as a cable.

RAM unit 104 will typically serve as a short term storage location for stored data 122 and instructions as processor 102 operates on stored data 122 and instructions. In the preferred embodiment of the present invention, RAM unit 104 will typically contain multiple program modules and multiple data structures. The programs will typically include an operating system 124 and user application 126. The programs will typically also include an isolation module 128, a translation module 130, and a modification module 132. Though only those programs are shown in RAM unit 104 of the preferred embodiment, many additional programs, which are omitted for the sake of simplicity and clarity, may also run on the data processing system 100 without departing from the scope or spirit of the present invention. Operating system 124 will typically control program execution, resource allocation, input/output operations, and other functions of data processing system 100. It will typically exist as a series of modules, only two of which are shown for the sake of simplicity. I/O module 134 will typically control the instructions sent to fixed disk storage unit 106, user I/O controller 108, network interface 110, display unit 112, and print controller 114. System control module 136 will typically regulate the functioning of the processor. User application 126 will typically provide a variety of functions that will vary from data processing system to data processing system without impact on the preferred embodiment, though they will often include applications, such as data processing system instruction preparation utilities, that will generate an instruction data structure 138, on which the preferred embodiment will operate.

In the preferred embodiment of the present invention, the data structures stored in RAM unit 104 will typically include the previously mentioned stored data 122, which contains a great variety of digitally stored information. RAM unit 104 will typically also include a translation data area 140, which will typically contain a series of at least four data structures. The first of these data structures, previously mentioned instruction data structure 138, contains a set of instructions for a data processing system, typically in an uncompiled application programming language, with comments on the instructions. Instruction data structure 138 may be generated by a compiler or other data processing system instruction preparation utility. The second of these data structures, comment text data structure 142, contains a set of comments that were included with the instructions for a data processing system in instruction data structure 138. The third of these data structures, translated text data structure 144, contains a set of translations of comments that were included with the instructions for a data processing system in instruction data structure 138. The fourth of these data structures, combined text data structure 146, contains both the set of translations of comments that were included with the instructions for a data processing system in the instruction data structure 138 and the set of comments that were included with the instructions for a data processing system in instruction data structure 138.

Other components of the first data processing system 100, whose functions have not yet been explained, will typically include a fixed-disk storage unit 106, a user I/O controller 108, a network interface 110, a display unit 112, and a print controller 114. Fixed-disk storage unit 106 typically serves as a long term storage location for data and instructions. User I/O controller 108 typically provides an interface for most peripheral equipment while the network interface 110 typically provides physical connectivity to the network 116 that allows logical connectivity to other data processing systems and devices. Print controller 114 typically provides physical and logical connectivity to output device 118 across a direct inter-system interface 120.

Figure 2:
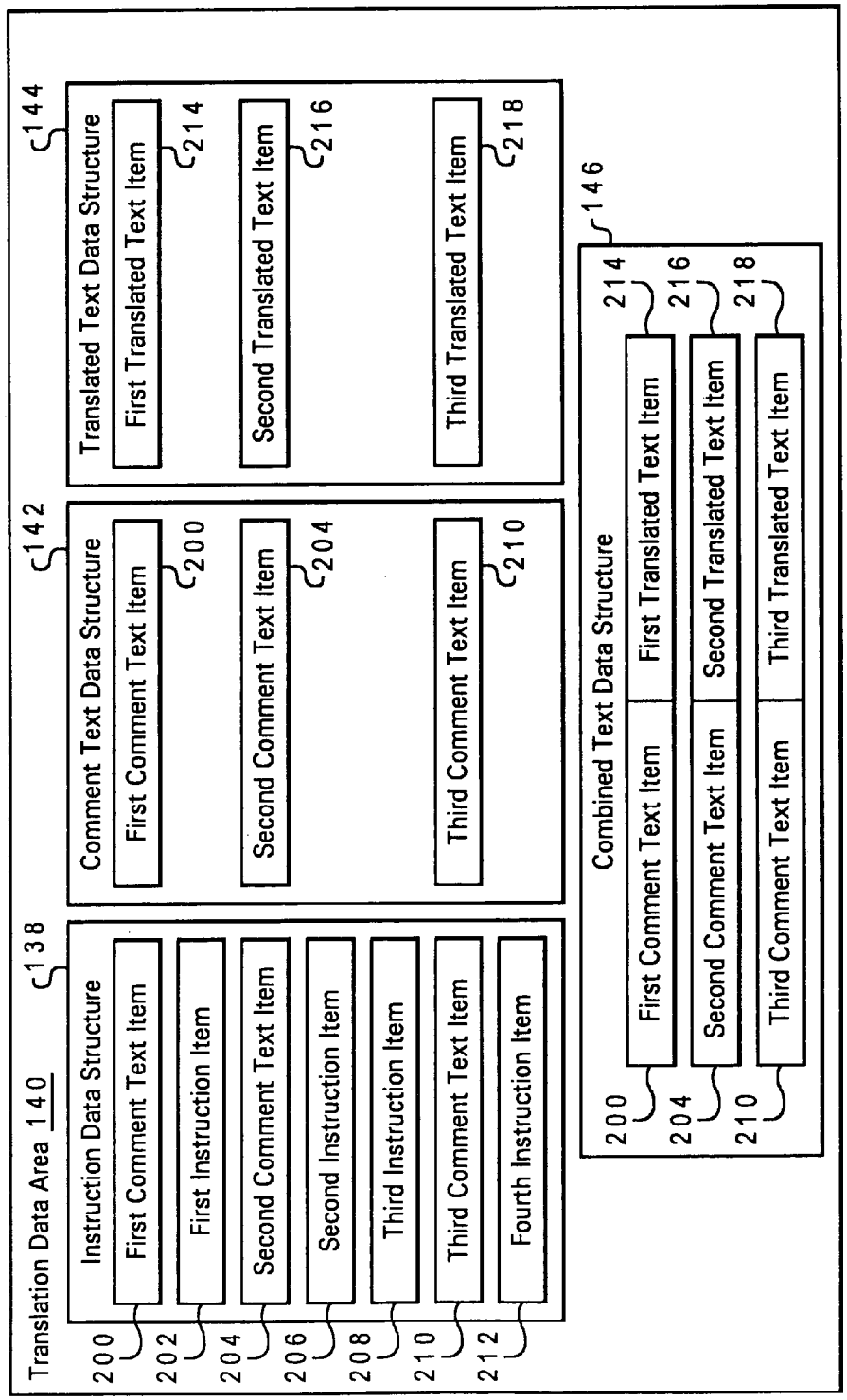
FIG. 2 is a simplified representation of an instruction data structure, a comment text data structure, a translated text data structure, and a combined text data structure in the translation data area of a RAM unit on a data processing system in accordance with a preferred embodiment of the present invention.

With reference to FIG. 2, simplified representation of an instruction data structure, a comment text data structure, a translated text data structure, and a combined text data structure in the translation data area of a RAM unit on a data processing system in accordance with a preferred embodiment of the present invention is depicted. In translation data area 140, instruction data structure 138, contains a set of instructions for a data processing system, typically in an uncompiled application programming language, with comments on the instructions. Instruction data structure 138 may be generated by a compiler or other data processing system instruction preparation utility. Instruction data structure 138 contains, among other items, a series of lines of code, some of which are comment text items and some of which are instruction items. Instruction data structures will vary in size and complexity, and instruction data structure 138, constitutes a simplified representation of the elements that will typically exist. Instruction data structure 138 contains a first comment text item 200, a first instruction item 202, a second comment text item 204, a second instruction item 206, a third instruction item 208, a third comment text item 210, and a fourth instruction item 212. First instruction item 202, second instruction item 206, third instruction item 208, and fourth instruction item 212 are lines of code that provide instructions to a data processing system to perform certain actions. They will typically be written in a machine instruction language such as assembly, Fortran, or Java. First comment text item 200, second comment text item 204, and third comment text item 210 are lines of code that provide comments on the functions of instruction data structure 138 to persons who interact with instruction data structure 138.

The second of these data structures, comment text data structure 142, contains, among other items that will vary from embodiment to embodiment, a set of comments that were included with the instructions for a data processing system in instruction data structure 138. Comment text data structure 142 will typically be generated by isolation module 128, as a repository of the comment text items that it has separated from instruction data structure 138. Comment text data structures will vary in size and complexity, and comment text data structure 142 constitutes a simplified representation of the elements that will typically exist. As represented herein, comment text data structure 142 contains first comment text item 200, second comment text item 204, and third comment text item 210. First comment text item 200, second comment text item 204, and third comment text item 210 are lines of code that provide comments on the functions of instruction data structure 138 to persons who interact with instruction data structure 138.

The third of these data structures, translated text data structure 144, contains a set of translations of comments that were included with the instructions for a data processing system in instruction data structure 138. Translated text data structure 144 will typically be generated by translation module 130, as a repository of translations of the comment text items that are present in the instruction data structure 138, but may also be generated by user application 126 or other data processing system instruction sets. In the case of some implementations of the present invention, translation data structure 144 will be generated through the manual translation, by a user, of the items in the comment text data structure. Other embodiments will employ automatic translation through the translation module 130. Translated text data structures will vary in size and complexity, and translated text data structure 144 constitutes a simplified representation of the elements that will typically exist. As representation herein, translated text data structure 144 contains first translated text item 214, second translated text item 216, and third comment text it em 218. First translated text item 214, second translated text item 216, and third translated text item 218 are translations of first comment text item 200, second comment text item 204, and third comment text item 210, respectively.

The fourth of these data structures, combined text data structure 146, contains both the set of translations of comments that were included with the instructions for a data processing system in the instruction data structure 138 and the set of comments themselves that were included with the instructions for a data processing system in instruction data structure 138. Combined text data structure 146 will typically be generated by the joint action of translation module 130 and isolation module 128. The purpose of the present invention is to produce combined text data structure 146 as a structure for viewing both comment text items and translations of the comment text items that are present in the instruction data structure 138. Combined text data structures will vary in size and complexity, and combined text data structure 146 constitutes a simplified representation of the elements that will typically exist. As represented herein, combined text data structure 146 contains first translated text item 214, second translated text item 216, and third comment text item 218. It also contains first comment text item 200, second comment text item 204, and third comment text item 210. First comment text item 200, second comment text item 204, and third comment text item 210 are lines of code that provide comments on the functions of instruction data structure 138 to persons who interact with instruction data structure 138. First translated text item 214, second translated text item 216, and third translated text item 218 are translations of first comment text item 200, second comment text item 204, and third comment text item 210, respectively.

The translated text items and comment text items will typically be organized, as in combined text data structure 146, with a comment text item organized logically adjacent to the translated text item that was generated from it. That is, first translated text item 214 is organized logically adjacent to first comment text item 200, second translated text item 216 is organized logically adjacent to second comment text item 204, and third translated text item 218 is organized logically adjacent to third comment text item 210. This facilitates the ability of data processing system 100 to display related comment text items and translated text items in a spatially adjacent manner on a display unit 112 or on an output device 118, such as a printer, across a direct intersystem interface 120, such as a cable. With the related items of comment text and translated text displayed as adjacent to each other, users who intend to check the translation of comment text items are therefore able to do so with little difficulty, solving the problem during translation checking of having to constantly refer from one item of translated text to a separate file containing the comment text in the original language.

Figure 3:
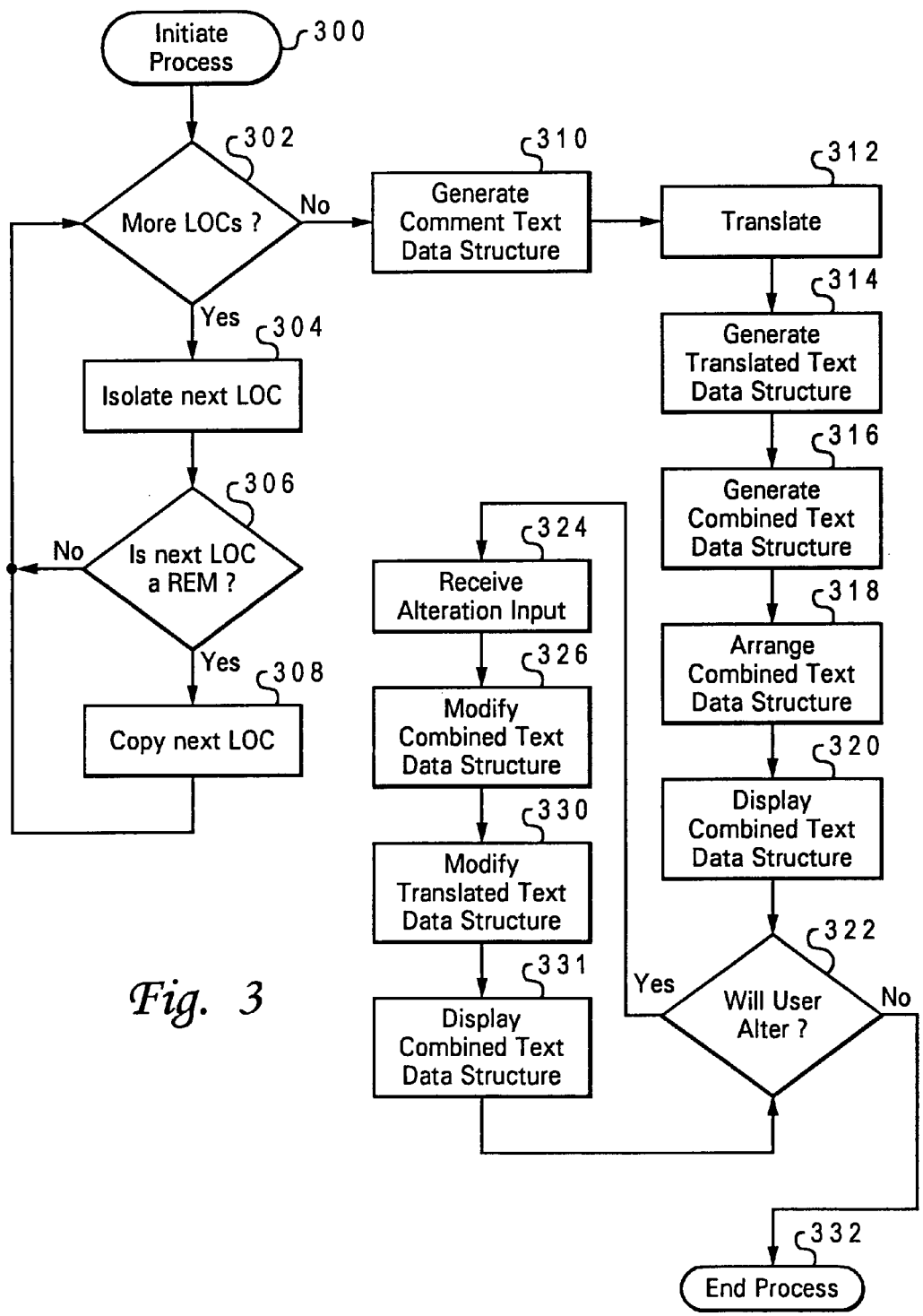
FIG. 3 depicts a high-level flowchart for a process of isolating comment portions of a data processing system instruction data structure and preparing them into a single data structure with translations of the same comments in accordance with a preferred embodiment of the present invention.

With reference to FIG. 3, a high-level flowchart for a process of isolating comment portions of a data processing system instruction data structure and preparing them into a single data structure with translations of the same comments in accordance with a preferred embodiment of the present invention is illustrated.

The process begins at step 300, which depicts the initiation of the process. The process will typically be initiated by a signal from operating system 124, which will inform isolation module 128 that an instruction data structure requires analysis. The operating system may generate a signal to inform isolation module 128 that an instruction data structure requires analysis on the basis of user input or automatically upon the creation of a file containing instruction data structures. The process then passes to step 302, which illustrates isolation module 128 determining if the instruction data structure contains additional lines of code (more LOCs) that isolation module 128 has not analyzed. When the process initiates in step 300 and then proceeds to step 302, then no lines of code will typically have been analyzed, and there will typically be lines of code awaiting analysis. If there are additional lines of code awaiting analysis, the process next passes to step 304, which depicts isolation 128 module isolating the next line of code. This step will typically consist of finding a line of code in an instruction data structure 138 and buffering it in RAM unit 104 for analysis.

The process then passes to step 306, which illustrates the isolation module determining if the line of code from instruction data structure 138 is a comment text item, frequently called a REM statement, or an instruction item. If the line of code is an instruction item, such as the first instruction item 202, the process then returns to step 302, which illustrates isolation module 128 determining if the instruction data structure contains additional lines of code that isolation module 128 has not analyzed. If, however, the line of code is a comment text item, such as second comment text item 204, then the process passes to step 308, which depicts isolation module 128 copying the line of code to a buffer, where it is held until it can be inserted into comment text data structure 142. The process then returns to step 302, which illustrates isolation module 128 determining if the instruction data structure contains additional lines of code (more LOCs) that isolation module 128 has not analyzed.

If, in step 302, the isolation module determines that no more lines of code await analysis, the process then passes to step 310, which depicts the isolation module generating comment text data structure 146. Comment text data structure 146 is generated by copying all of the previously buffered lines of code into a data structure in RAM unit 104. Comment text data structure 142, contains, among other items that will vary from embodiment to embodiment, a set of comments that were included with the instructions for a data processing system in instruction data structure 138. Comment text data structure 142 will typically be generated by isolation module 128, as a repository of the buffered comment text items that it has separated from instruction data structure 138. Comment text data structures will vary in size and complexity, and comment text data structure 142 constitutes a simplified representation of the elements that will typically exist. As represented herein, comment text data structure 142 contains first comment text item 200, second comment text item 204, and third comment text item 210. First comment text item 200, second comment text item 204, and third comment text item 210 are lines of code that provide comments on the functions of instruction data structure 138 to persons who interact with instruction data structure 138.

The process next passes to step 312, which depicts comment text data structure 146 being translated. The translation may be performed automatically by translation module 130 or may be performed manually by human translators. After generating comment text data structure 146, isolation module will typically signal operating system 124 that comment text data structure 146 is available for translation. Depending on the settings chosen for a particular embodiment, operating system 124 will then either inform the user that comment text data structure 146 is available for translation or inform translation module 130 that comment text data structure 146 is available for translation. In either case, the translation will typically be performed thereafter, generating a translated text item such as third translated text item 218 corresponding to each comment text item such as third comment text 210.

The process then passes to step 314, which illustrates translation module 130 generating translated text data structure 144. Translation module 130 will take all available translated text data items, provided by a human translator or by translation module 130 itself, and will combine them in a translated text data structure 144. Translated text data structure 144, contains a set of translations of comments that were included with the instructions for a data processing system in instruction data structure 138. Translated text data structure 144 will typically be generated by translation module 130, as a repository of translations of the comment text items that are present in the instruction data structure 138, but may also be generated by user application 126 or other data processing system instruction sets. In the case of some implementations of the present invention, translation data structure 144 will be generated through the manual translation, by a user, of the items in the comment text data structure. Other embodiments will employ automatic translation through the translation module 130. Translated text data structures will vary in size and complexity, and translated text data structure 144 constitutes a simplified representation of the elements that will typically exist. As represented herein, translated text data structure 144 contains first translated text item 214, second translated text item 216, and third comment text item 218. First translated text item 214, second translated text item 216, and third translated text item 218 are translations of first comment text item 200, second comment text item 204, and third comment text item 210, respectively.

The process next passes to step 316, which depicts translation module 130 generating combined text data structure 146. Translation module 130, working in concert with isolation module 128, combines the comment text items from comment text 25 data structure 142 with translated text items from translated text data structure 144 to create combined text data structure 146. Combined text data structure 146, contains both the set of translations of comments that were included with the instructions for a data processing system in the instruction data structure 138 and the set of comments themselves that were included with the instructions for a data processing system in instruction data structure 138. Combined text data structure 146 will typically be generated by the joint action of translation module 130 and isolation module 128. Combined text data structures will vary in size and complexity, and combined text data structure 146 constitutes a simplified representation of the elements that will typically exist. As represented herein, combined text data structure 146 contains first translated text item 214, second translated text item 216, and third comment text item 218. It also contains first comment text item 200, second comment text item 204, and third comment text item 210. First comment text item 200, second comment text item 204, and third comment text item 210 are lines of code that provide comments on the functions of instruction data structure 138 to persons who interact with instruction data structure 138. First translated text item 214, second translated text item 216, and third translated text item 218 are translations of first comment text item 200, second comment text item 204, and third comment text item 210, respectively.

The process then passes to step 318, which illustrates translation module 130 arranging combined text data structure 146. The translated text items and comment text items will typically be organized, as in combined text data structure 146, with a comment text item organized logically adjacent to the translated text item that was generated from it. That is, first translated text item 214 is organized logically adjacent to first comment text item 200, second translated text item 216 is organized logically adjacent to second comment text item 204, and third translated text item 218 is organized logically adjacent to third comment text item 210. This facilitates the ability of data processing system 100 to display related comment text items and translated text items in a spatially adjacent manner on a display unit 112 or on an output device 118, such as a printer, across a direct inter-system interface 120, such as a cable. With the related items of comment text and translated text displayed as adjacent to each other, users who intend to check the translation of comment text items are therefore able to do so with little difficulty, solving the problem during translation checking of having to constantly refer from one item of translated text to a separate file containing the comment text in the original language.

Once combined text data structure 146 is arranged, the process then passes to step 320, which illustrates data processing system 100 displaying combined text data structure 146 to the user through display unit 112 or on an output device 118, such as a printer, across a direct inter-system interface 120, such as a cable. With the related items of comment text and translated text displayed as adjacent to each other, users who intend to check the translation of comment text items are therefore able to do so with little difficulty, solving the problem during translation checking of having to constantly refer from one item of translated text to a separate file containing the comment text in the original language. The purpose of the present invention is to produce combined text data structure 146 as a structure for viewing both comment text items and translations of the comment text items that are present in the instruction data structure 138.

The process next passes to step 322, which depicts data processing system 100 prompting the user to discover whether the user will alter the translated text data items contained in combined text data structure 146. If the user, after viewing the display of both comment text items and translations of the comment text items that are present in instruction data structure 138, indicates a desire to make modifications, the process then passes to step 324, which illustrates modification module 132 receiving alteration input that will typically indicate the ways in which the user wants to modify translations of the comment text items that are present in instruction data structure 138. The process next passes to step 326, which depicts modification module 132 modifying combined text data structure 146 according to user input received in step 324. The process then passes to step 330, which depicts modification module 132 modifying combined text data structure 146 according to user input received in step 324.

The process next passes to step 331, which illustrates data processing system 100 displaying combined text data structure 146 to the user through display unit 112 or on an output device 118, such as a printer, across a direct inter-system interface 120, such as a cable. With the related items of comment text and translated text displayed as adjacent to each other, users who intend to check the translation of comment text items are therefore able to do so with little difficulty, solving the problem during translation checking of having to constantly refer from one item of translated text to a separate file containing the comment text in the original language. The purpose of the present invention is to produce combined text data structure 146 as a structure for viewing both comment text items and translations of the comment text items that are present in the instruction data structure 138.

The process next returns to step 322, which depicts data processing system 100 prompting the user to discover whether the user will alter the translated text data items contained in combined text data structure 146. If the user, after viewing the display of both comment text items and modified translations of the comment text items that are present in instruction data structure 138, indicates a desire to make additional modifications, the process then passes to step 324, which illustrates modification module 132 receiving alteration input that will typically indicate the ways in which the user wants to modify translations of the comment text items that are present in instruction data structure 138. If, in step 322, which depicts data processing system 100 prompting the user to discover whether the user will alter the translated text data items contained in combined text data structure 146, the user is satisfied with the translation and does not desire to make modifications, the process then passes to step 332, which illustrates the process ending.

Although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for preparing reviewable translations of comment text contained within a computer program code data structure that further includes program code items, comprising:

identifying one or more untranslated comment text items within the computer program code data structure;

copying each of the one or more untranslated comment text items from the computer program code data structure to a comment text data structure in which the untranslated comment text items are isolated from the program code items;

translating each of the one or more untranslated comment text items within the comment text data structure into a corresponding one or more translated comment text items;

combining each of the one or more translated comment text items and each of the one or more untranslated comment text items from the comment text data structure within a combined text data structure in which the untranslated comment text items and the translated comment text items are isolated from the program code items; and arranging each of the one or more translated comment text items within the combined text data structure in logical proximity to a corresponding untranslated comment text item.

2. The method of claim 1, wherein the combining step is followed by modifying the one or more translated comment text items in the combined text data structure responsive to user input.

3. The method of claim 1, wherein the computer program code data structure is a source code file of machine-readable instructions on a machine-readable medium.

4. The method of claim 1, wherein said translating step is followed by combining the one or more translated comment text items within a translated text data structure.

5. The method of claim 4, wherein the modifying step further comprises modifying the one or more translated comment text items in the translated text data structure to match the one or more translated comment text items in the combined text data structure.

6. The method of claim 1, said identifying step comprising distinguishing between the untranslated comment text items and the program code items within the computer program code data set.

7. The method of claim 1, further comprising displaying each of the one or more translated comment text items within the combined text data structure in spatial proximity to a corresponding untranslated comment text item.

8. A system for preparing reviewable translations of comment text contained within a computer program code data structure that further includes program code items, comprising:

isolation module data processing means for identifying one or more untranslated comment text items within the computer program code data structure;

isolation module data processing means for copying each of the one or more untranslated comment text items from the computer program code data structure to a comment text data structure in which the untranslated comment text items are isolated from the program code items;

translation module data processing means for translating each of the one or more untranslated comment text items within the comment text data structure into a corresponding one or more translated comment text items;

processing means for combining each of the one or more translated comment text items and each of the one or more untranslated comment text items from the comment text data structure within a combined text data structure in which the untranslated comment text items and the translated comment text items are isolated from the program code items; and processing means for arranging each of the one or more translated comment text items within the combined text data structure in logical proximity to a corresponding untranslated comment text item.

9. The system of claim 8, further comprising modification module processing means for modifying the one or more translated comment text items in the combined text data structure responsive to user input.

10. The system of claim 8, wherein the computer program code data structure is a source code file of machine-readable instructions on a machine-readable medium.

11. The system of claim 8, wherein said translation module data processing means further comprises means for combining the one or more translated comment text items within a translated text data structure.

12. The system of claim 11, wherein the modification module processing means further comprises means for modifying the one or more translated comment text items in the translated text data structure to match the one or more translated comment text items in the combined text data structure.

13. The system of claim 8, said isolation module data processing means further comprising means for distinguishing between the untranslated comment text items and the program code items within the computer program code data set.

14. The system of claim 8, further comprising means for displaying each of the one or more translated comment text items within the combined text data structure in spatial proximity to a corresponding untranslated comment text item.

15. A computer-readable medium having encoding thereon computer-executable instructions for preparing reviewable translations of comment text contained within a computer program code data structure that further includes program code items, said computer-executable instructions performing a method comprising:

identifying one or more untranslated comment text items within the computer program code data structure;

copying each of the one or more untranslated comment text items from the computer program code data structure to a comment text data structure in which the untranslated comment text items are isolated from the program code items;

translating each of the one or more untranslated comment text items within the comment text data structure into a corresponding one or more translated comment text items;

combining each of the one or more translated comment text items and each of the one or more untranslated comment text items from the comment text data structure within a combined text data structure in which the untranslated comment text items and the translated comment text items are isolated from the program code items; and arranging each of the one or more translated comment text items within the combined text data structure in logical proximity to a corresponding untranslated comment text item.

16. The computer-readable medium of claim 15, wherein the combining step is followed by modifying the one or more translated comment text items in the combined text data structure responsive to user input.

17. The computer-readable medium of claim 15, wherein the computer program code data structure is a source code file of machine-readable instructions on a machine-readable medium.

18. The computer-readable medium of claim 15, wherein said translating step is followed by combining the one or more translated comment text items within a translated text data structure.

19. The computer-readable medium of claim 18, wherein the modifying step further comprises modifying the one or more translated comment text items in the translated text data structure to match the one or more translated comment text items in the combined text data structure.

20. The computer-readable medium of claim 15, said identifying step comprising distinguishing between the untranslated comment text items and the program code items within the computer program code data set.

* * * * *